(No Model.)
J. F. CADWELL.
GATE.
No. 265,572. Patented Oct. 10, 1882.
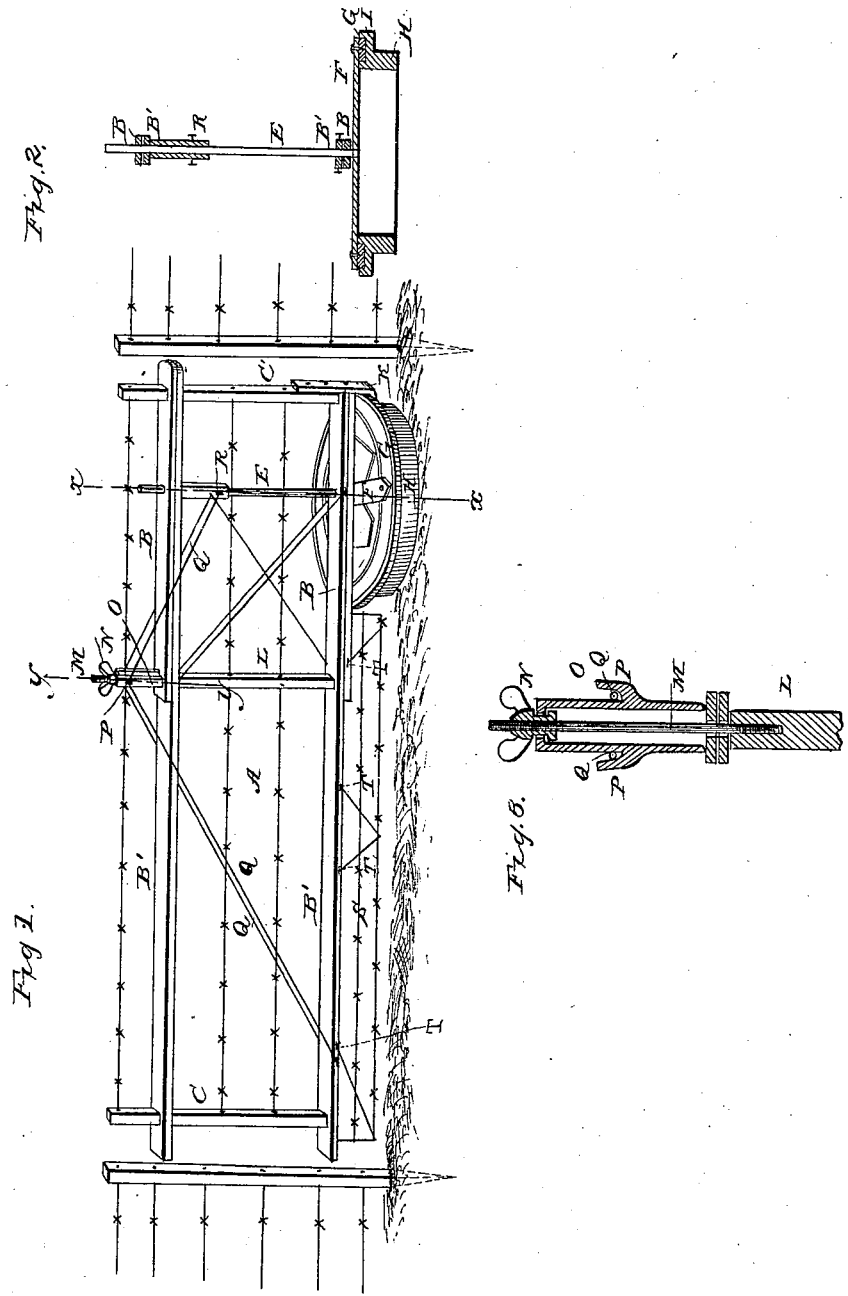
WITNESSES:
Fred. G. Dieterich
Jno. W. Stockett
INVENTOR.
James F. Cadwell
by C. A. Snow & Co.
ATTORNEYS.

UNITED STATES PATENT OFFICE.

JAMES F. CADWELL, OF WATERFORD, WISCONSIN.

GATE.

SPECIFICATION forming part of Letters Patent No. 265,572, dated October 10, 1882.

Application filed July 13, 1882. (No model.)

*To all whom it may concern:*

Be it known that I, JAMES F. CADWELL, of Waterford, in the county of Racine and State of Wisconsin, have invented certain new and useful Improvements in Gates; and I do hereby declare that the following is a full, clear, and exact description of the invention, which will enable others skilled in the art to which it appertains to make and use the same, reference being had to the accompanying drawings, which form a part of this specification.

This invention relates to gates of that class which swing on a turn-table; and it consists in certain improvements in the construction and operation of the same.

In the drawings, Figure 1 is a perspective view of the gate; Fig. 2, a vertical sectional view on the line $xx$, Fig. 1; and Fig. 3, a like view on the line $yy$.

A designates the gate, which has long horizontal rails B' B', strengthened at the rear by short top and bottom rails, B B, and united by vertical pieces C C', the intermediate space being closed by strands of barbed or other wire, D.

The gate swings upon a vertical pivot rod or bar, E, carrying at its bottom a horizontal cross-piece, F, provided with a ring or disk, G, turning in a fixed turn-table, H, which may be provided with an annular shoulder, I, at its upper edge, under which the end J of a casting, K, fixed on the lower end of the rear post, C', travels and forms a guide.

L is a central vertical bar, surmounted by a screw-threaded rod, M, on which is vertically adjustable by means of a lifting thumb-nut, N, a ∩ bail or cap, O, the sides of which are provided with lateral shoulders or nibs P P.

Q Q are lifting wires, chains, or cords, which are passed over the nibs P P, and have one end secured to the front lower end of the gate and their other ends to the upper portion of rod E, as at R. The space between the lower horizontal rail, B', and the ground, caused by the elevation of the turn-table, is closed by a wire guard or shield, S, adapted to be hooked over eyes T T on rail B'. Thus the shield may be removed for the passage of pigs and other small animals.

The operation and advantages of my invention will be readily understood. The gate readily swings on the turn-table. By raising the bail O the wires Q Q are stretched or held taut, thus compensating for any sagging of the gate, and also enabling its free swinging end to be raised above snow or any other incidental obstructions.

I claim and desire to secure by Letters Patent—

1. The combination, with a gate which has long horizontal rails B' B', strengthened at the rear by short top and bottom rails, B B, and united by vertical pieces C C', of a bar or rod, L, having a vertically-adjustable lifting-bail, a vertical pivot-rod, E, and lifting-wires, substantially as set forth.

2. The combination, with the gate, of a vertical pivot rod or bar, L, surmounted by a screw-threaded rod, on which is vertically adjustable by means of a lifting thumb nut a bail having shoulders or lugs on each side, and lifting-wires passing over the latter, substantially as set forth.

In testimony that I claim the foregoing as my own I have hereto affixed my signature in presence of two witnesses.

JAMES F. CADWELL.

Witnesses:
CHRISTIAN BERGER,
IRA A. RICE.